Figure 1:
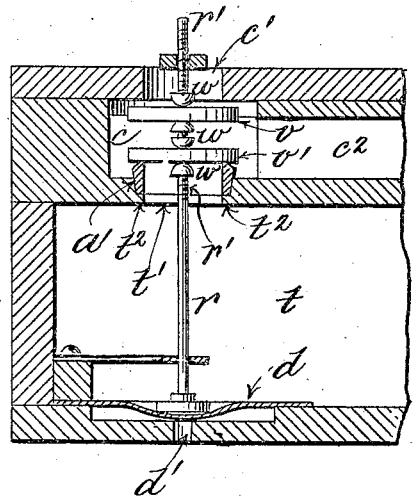

No. 835,778. PATENTED NOV. 13, 1906.
G. P. BRAND.
PNEUMATIC VALVE SEAT.
APPLICATION FILED FEB. 10, 1906.

Witnesses:
D. W. Gardner.
R. Sloan

Inventor:
Geo. P. Brand
By his Attorney
Geo. Wm. Miatt

UNITED STATES PATENT OFFICE.

GEORGE P. BRAND, OF NEW YORK, N. Y.

PNEUMATIC VALVE-SEAT.

No. 835,778.      Specification of Letters Patent.      Patented Nov. 13, 1906.

Original application filed January 31, 1905, Serial No. 243,463. Divided and this application filed February 10, 1906.
Serial No. 300,432.

*To all whom it may concern:*

Be it known that I, GEORGE P. BRAND, a citizen of the United States, residing in the city of New York, borough of Bronx, county and State of New York, have invented certain new and useful Improvements in Pneumatic Valve-Seats, of which the following is a specification.

My invention is designed to obviate the objections appertaining to the use of pneumatic valve-seats as heretofore constructed; and it consists, essentially, in a seat adapted to be driven into position in such manner as to obviate the necessity for the use of securing-screws, packing, &c., substantially as hereinafter set forth.

By dispensing with the use of securing-screws or equivalent means for fastening the seats in position I not only save the time and labor involved in their application, which is considerable in the aggregate where a large number of seats are to be provided, as in chestwork, but I also avoid weakening the supporting material. I also save the time, labor, and cost of packing the joints between the seats and their supports and at the same time secure a more reliable and perfect air-tight joint or seal between the parts.

This application is a subdivision of that filed by me January 31, 1905, Serial No. 243,463, the present invention consisting in and being restricted to the use in conjunction with a partition of relatively soft compressible non-metallic material formed with a cylindrical aperture having an internal annular flange, of a metallic valve-seat formed with an internal cylindrical opening constituting a port of uniform diameter throughout and having a conical peripheral surface convergent from its greater diameter near its valve-seating edge to its driving edge, the latter being of essentially the same external diameter as the internal diameter of the cylindrical aperture in the said relatively soft compressible non-metallic partition in the pneumatic apparatus, whereby the act of driving the said metallic seat into the cylindrical aperture until its driving edge rests against the said internal annular flange will compress the sides of the aperture and cause them to conform to the peripheral conical surface of the metallic valve-seat, thereby creating an air-tight joint between the opposed surfaces in actual contact.

Wood being the material of which partitions in pneumatic apparatus are ordinarily formed, and such wood being invariably of a soft compressible nature, it follows that by the use of my peripherally-tapered valve-seat in a cylindrical aperture of a diameter practically the same as that externally of the driving edge of the seat a more positive seal will be created by the displacement and compression of the fiber constituting the sides of the aperture than is possible between two opposed cylindrical surfaces fitting one within the other, as heretofore. Hence by this simple means I obviate the loose and leaky joints so objectionable in pneumatic apparatus, especially in automatic piano-players and the like, in which the exhaust mechanism is operated manually.

Figure 2:
Figure 3:
Figure 4:

In the accompanying drawings, Figure 1 is a sectional view of a portion of the chestwork of pneumatic apparatus sufficient to illustrate the practical application of my invention. Figs. 2, 3, and 4 are respectively a side elevation, a face, and a reverse view of my improved valve-seat.

By way of illustrating the practical application of my invention I herein show, symbolically, parts of pneumatic apparatus, in which T represents a portion of chestwork having the tension-chamber $t$, communicating with the valve-chamber $c$ through the port $t'$, the valve-chamber $c$ communicating with the atmosphere through the port $c'$ and with a pneumatic or other device to be actuated through the port $c^2$. $v\ v'$ are valves secured adjustably upon the rod $r$ in the usual way by leather nuts $w\ w$, engaging the screw-thread $r'$ on the said valve-rod. The opposite end of the valve-rod $r$ rests against a disk on the diaphragm $d$ in the usual manner, the diaphragm being actuated through the port $d'$ by reason of the communication of the latter with a tracker-board or other means of admitting air.

My improved seat consists, essentially, of an annular ring A, of metal, formed with a seating edge $a$ and having its peripheral surface $a'$ slightly tapered, conical, or convergent. The port $t'$ is a cylindrical aperture of a diameter approximately equal to the external diameter of the driving edge $a^2$ of the seat-ring A, so that when the latter is driven into position the adjacent inner surface of said port $t'$ will be compressed sufficiently to retain the seat-ring A in position. A feature of my invention in this connection consists in preparing the surface of the port for the reception of the seat-ring by treating such surface with paraffin. This method of insuring an absolutely perfect air-tight joint is resorted to where the conditions of use render such a course desirable, as where very high tensions are employed or where the parts are subjected to unusual variations in temperature or climatic changes. Otherwise the compression of the sides of the port by the tapering periphery $a$ of the seat-ring A may be relied upon to effect an air-tight joint between the parts.

Wood being the material in which the valve-ports are formed, as a rule, in pneumatic apparatus generally, it follows that the relatively soft absorbent fiber thereof is especially adapted for treatment with paraffin, which not only forms a lining or coating for the internal walls of the port, but also penetrates to some degree into said walls, so as to become essentially a part thereof, thereby affording something more than a mere superficial coating, which might be disturbed in whole or in part during the operation of driving the seat A home within the port $t'$ until its driving edge $a^2$ rests against the annular flange $t^2$. This annular flange $t^2$, formed within the port $t'$, is an important and essential feature of my present invention and distinguishes it from my concurrent application hereinbefore referred to, in which an external flange or shoulder is formed directly upon the metallic valve-seat itself, which structure I expressly disclaim in the present application, confining myself to an annular shoulder or flange $t^2$, formed directly within the port, against which the driving edge $a^2$ of the seat-ring A may be made to abut, thereby gaging its position with accuracy and at the same time increasing the area of surface-contact between the parts and by forming a rectangular offset or joint, rendering the seal more effective.

It will be seen that owing to the absence of securing-screws, &c., my seat-ring may be successfully applied to supports or partitions so thin and delicate as to render the use of the old form of seat impractical, and hence I am enabled to economize in both space and weight in the manufacture of pneumatic apparatus. I can thus secure a seat in position with relation to a port with an air-tight joint between the opposed parts without resort to packing in the ordinary sense of the word and without the use of screws or other appliances. The saving in time and labor in applying these seats as compared with those heretofore used is of great practical importance, as is also the fact that the supports are left intact and unimpaired or weakened by the use of my seat-rings, by which the greatest simplicity in both construction and application is attained.

What I claim as my invention, and desire to secure by Letters Patent, is—

In pneumatic apparatus, the combination of a metallic valve-seat formed with an internal cylindrical opening constituting a port of uniform diameter throughout with a conical peripheral surface convergent from its greater diameter near its valve-seating edge to its driving edge, and a partition of relatively soft compressible non-metallic material in said pneumatic apparatus formed with a cylindrical aperture of practically the same diameter as the external diameter of the driving edge of the said metallic valve-seat, said cylindrical aperture being formed with an internal annular flange for the reception of the driving edge of the metallic seat, whereby the act of driving said metallic seat into said aperture until its driving edge rests against said internal annular flange will compress the cylindrical sides of the aperture and cause them to conform to the peripheral conical surface of the metallic valve-seat, thus insuring an air-tight joint between the opposed surfaces in actual contact with each other, for the purpose described.

GEORGE P. BRAND.

Witnesses:
 D. W. GARDNER,
 GEO. WM. MIATT.